US009122718B2

(12) United States Patent
Wong

(10) Patent No.: US 9,122,718 B2
(45) Date of Patent: Sep. 1, 2015

(54) DYNAMIC DIRECTORY CONTROL EXECUTION

(71) Applicant: Quest Software, Inc., Aliso Viejo, CA (US)

(72) Inventor: Kam-Keung Wong, Sinking Spring, PA (US)

(73) Assignee: Dell Software Inc., Aliso Viejo, CA (US)

( * ) Notice: Subject to any disclaimer, the term of this patent is extended or adjusted under 35 U.S.C. 154(b) by 34 days.

(21) Appl. No.: 13/721,769

(22) Filed: Dec. 20, 2012

(65) Prior Publication Data

US 2013/0263158 A1 Oct. 3, 2013

Related U.S. Application Data

(60) Provisional application No. 61/617,471, filed on Mar. 29, 2012.

(51) Int. Cl.
G06F 9/54 (2006.01)
G06F 9/44 (2006.01)
G06F 17/30 (2006.01)

(52) U.S. Cl.
CPC ............ *G06F 17/30386* (2013.01); *G06F 9/44* (2013.01); *G06F 17/3056* (2013.01)

(58) Field of Classification Search
None
See application file for complete search history.

(56) References Cited

U.S. PATENT DOCUMENTS

| 6,715,128 | B1 | 3/2004 | Hirashima et al. | |
|---|---|---|---|---|
| 6,789,181 | B1 | 9/2004 | Yates et al. | |
| 7,577,092 | B2 * | 8/2009 | San Andres et al. | 370/230 |
| 7,725,507 | B1 | 5/2010 | van Rietschote et al. | |
| 3,026,249 | A1 | 10/2013 | Wong | |
| 2001/0027445 | A1 | 10/2001 | Eichelsdoerfer et al. | |
| 2004/0098615 | A1 * | 5/2004 | Mowers et al. | 713/201 |
| 2005/0080791 | A1 | 4/2005 | Ghatare | |
| 2007/0078887 | A1 | 4/2007 | Harvey et al. | |
| 2007/0288253 | A1 | 12/2007 | Cobb et al. | |
| 2008/0209040 | A1 | 8/2008 | Rathi | |
| 2008/0256020 | A1 * | 10/2008 | Wakefield | 707/1 |
| 2009/0240654 | A1 | 9/2009 | Limber et al. | |
| 2010/0199352 | A1 | 8/2010 | Hill et al. | |

OTHER PUBLICATIONS

K. Zeilenga, Jun. 2006, Lightweight Directory Access Protocol (LDAP): Directory Information Models, Open LDAP Foundation, http://www.ietf.org/rfc/rfc4512.txt, pp. 1-45.
Young, Lee W., "International Search Report" for the International Application PCT/US13/34339 as mailed Jun. 10, 2013 (2 pages).

* cited by examiner

*Primary Examiner* — Andy Ho
*Assistant Examiner* — Abdou Seye
(74) *Attorney, Agent, or Firm* — Winstead PC

(57) ABSTRACT

Systems and methods for extending the capability of a directory processor by, for example, registering a control are presented. This control can be a non-native control, or a modification to a native control. Further, this disclosure describes example of systems and methods for performing a directory operation, which may include one or more controls. At least some of the one or more controls may be non-native or dynamic controls. In some cases, some of the controls may be native controls.

26 Claims, 4 Drawing Sheets

DYNAMIC DIRECTORY CONTROL EXECUTION

RELATED APPLICATIONS

This disclosure claims priority to U.S. Provisional Application No. 61/617,471 filed Mar. 29, 2012 and entitled "DYNAMIC DIRECTORY CONTROLS", the disclosure of which is expressly incorporated by reference herein in its entirety. In addition, this disclosure is related to U.S. patent application Ser. No. 13/721,811, filed on Dec. 20, 2012 and entitled "DYNAMIC DIRECTORY CONTROL REGISTRATION", the disclosure of which is expressly incorporated by reference herein.

TECHNICAL FIELD

The present disclosure relates generally to the field of directories. More specifically, the present disclosure relates to the registration and use of dynamic directory controls.

BACKGROUND

Many modern applications are designed to work with large quantities of data. Often this data can include a plethora of data entries that are similar in form, but differ in content. For example, a corporate address book may include thousands of entries with each entry including a name, address, phone number, and e-mail address. In many cases, the data is stored as a directory.

Applications have been developed to help manage directories. Many of the directories and associated applications are based on set of protocols, such as the X.500 protocol or the Lightweight Directory Access Protocol (LDAP). These protocols may include a set of directory operations as part of the protocol definition. For example, the protocol may specify a set of commands for updating data in the directory.

SUMMARY

This disclosure describes examples of systems and methods for extending the capability of a directory processor by, for example, registering a control. This control can be a non-native control, or a modification to a native control. Further, this disclosure describes examples of systems and methods for performing a directory operation, which may include one or more controls. At least some of the one or more controls may be non-native or dynamic controls. In some cases, some of the controls may be native controls.

In some embodiments, a method for performing a directory operation may be performed by a computing system comprising one or more processors. The method may include the system receiving at a directory processor a directory operation comprising a control. The system can determine whether the control is a registered control. In response to determining that the control is a registered control, the system may identify a directory application configured to process the control. The system may provide the control to the directory application to process, thereby enabling a directory operation to comprise one or more controls that the directory processor is not natively configured to execute. Further, the system can execute the directory operation.

In certain implementations, in response to determining that the control is a registered control, the system removes the control from the directory operation. In some cases, the control is removed from the directory operation prior to executing the directory operation. In certain implementations, in response to determining that the control is a registered control, the system modifies the control of the directory operation.

In some embodiments, in response to providing the control to the directory application, the system receives a response from the directory application. The system may then execute the directory operation based on the received response. In some cases, the response may include a modified directory operation. In such cases, executing the directory operation may include executing the modified directory operation.

In some embodiments, in response to determining that the control is a native control, the system performs an operation associated with the native control. The system can then execute the directory operation without removing the control from the directory operation. In some cases, the system may execute the directory operation based on the control.

For certain implementations, the system provides a result of processing the directory operation to the directory application, thereby enabling the directory application to process the control based on the result of processing the directory operation.

In some embodiments, in response to determining that the control is a registered control, the system performs a first process associated with the directory operation to obtain a first directory operation result. The system may provide the first result to the directory application, thereby enabling the directory application to use the first result in processing the control. Further, the system can receive a control result from the directory application. The system may then perform a second process associated with the directory operation based on the control result to obtain a second directory operation result.

In some embodiments, a method for extending the capability of a directory processor may be performed by a computing system comprising one or more processors. The method may include the system receiving a control definition. The system may access a control identifier associated with the control definition. Further, the system may determine whether the control identifier exists in a control database associated with a directory processor. In response to determining that the control identifier does not exist in the control database, the system may register the control definition with the control database.

In some embodiments, registering the control definition with the control database can include the system injecting the control identifier into the directory processor. In some cases, registering the control definition with the control database includes accessing an Application Programming Interface (API) associated with the directory processor.

In some embodiments, the system identifies a directory application associated with the control definition. The system can then register the directory application with the control database, wherein the directory application is associated with the control definition at the control database.

In some variations, the system, in response to determining that the control identifier exists in the control database, determines whether a provider of the control definition is authorized to modify an existing control definition. In response to determining that the provider is authorized to modify the existing control definition, the system modifies the existing control definition based on the received control definition. Modifying the existing control definition can include the system replacing the existing control definition with the received control definition.

In some embodiments, the control database is configured to store control definitions associated with non-native controls. Further, determining whether the control identifier exists in the control database can include the system determining whether the control identifier exists in a native control database. The native control database can be configured to store the identity of native controls.

In some cases, registering the control definition with the control database includes the system registering when an operation associated with the control definition is performed.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF EMBODIMENTS

Introduction

Figure 1:
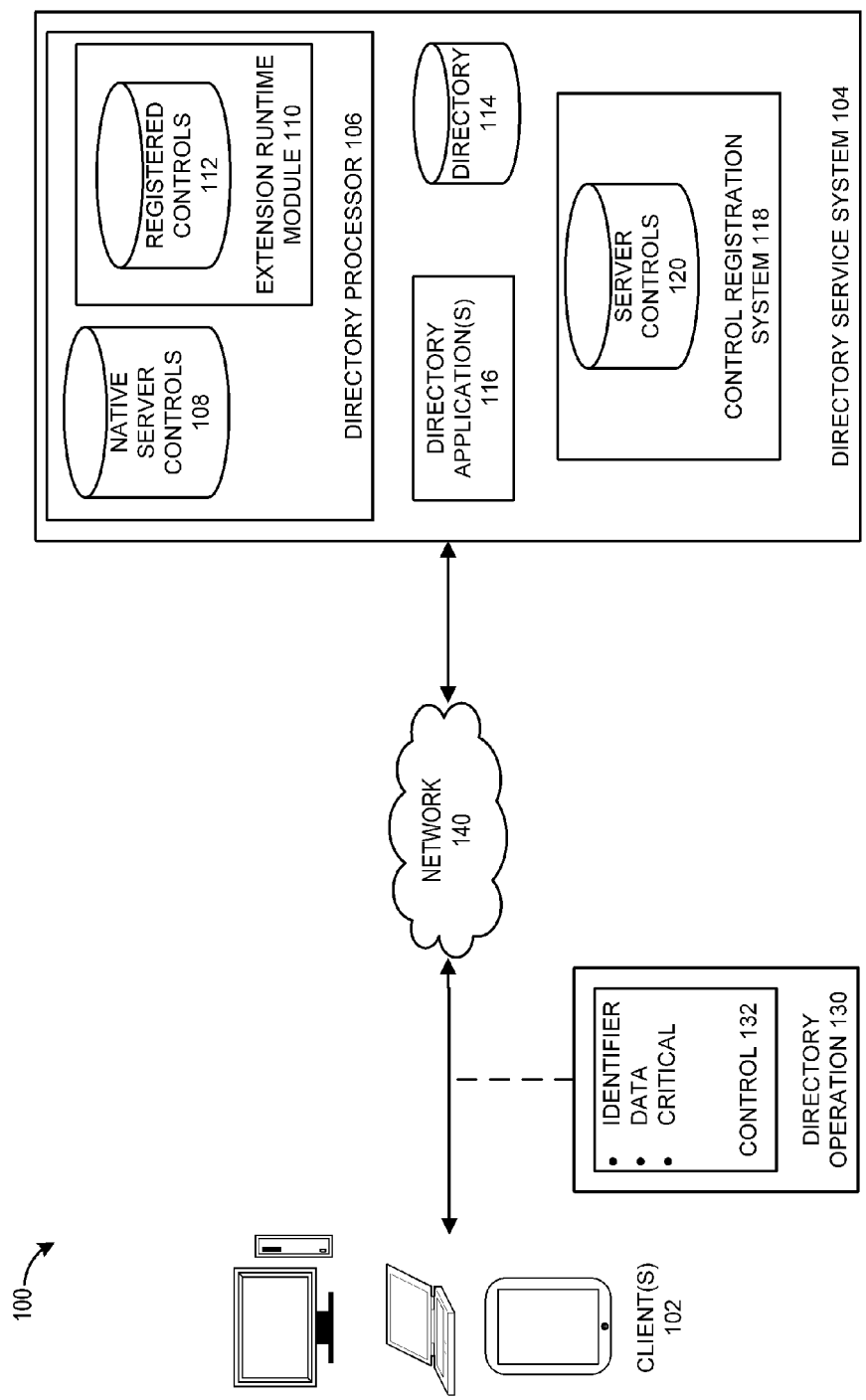
FIG. 1 illustrates an example of a directory service environment in accordance with some embodiments of the present disclosure.

The use of directories provides one method for categorizing and providing access to large quantities of data. While directories are not limited to large quantities of data, they enable data to be organized and sorted in a structure that facilitates the management and access of a large number of data entries or records. A traditional example of a directory is a telephone directory. Today, electronic directories, or directories implemented on one or more computer systems, have become common for organizing data. Some examples of electronic directories can include electronic telephone books, address books, email systems, and file organization systems. As used herein, unless stated otherwise, the term "directory" is used to refer to electronic directories.

A number of directory access protocols can be used to implement a directory and to provide access to the directory. For example, a number of directories are based on the X.500 protocol. Moreover, a number of these X.500 based protocols provide for a hierarchical organization of entries in the directory.

Some directory access protocols are not easily extensible if they are extensible at all. Thus, some directory access protocols may be limited to the operations, or directory operations, that are defined by or included in the protocol.

One method for extending the functionality of operations is through the use of controls. An access protocol message can include a directory operation and a control. The control can cause modifications to the execution of the operation. To simplify discussion, the access protocol message is generally described with relation to a single directory operation, and the directory operation is generally described as including a single control. However, this disclosure is not limited to a single directory operation or control. Those skilled in the art will understand that an access protocol message can include one or more directory operations. Further, those skilled in the art will understand that a directory operation may include or be associated with one or more controls.

In some cases, the selection of a control is limited to the controls specified by the protocol implemented by the directory. For example, a directory that implements the Lightweight Directory Access Protocol (LDAP) can process controls to extend the functionality of operations. These controls and operations may be included as part of an LDAP message. However, LDAP does not generally support dynamically adding new server controls. Further, LDAP does not generally allow arbitrary information to be included with an LDAP operation, thereby limiting the options for extending the functionality of the LDAP operation.

Described herein is a system and associated processes for enabling the functionality of a directory system to be extended through the use of dynamic controls. These dynamic controls may include controls that may be application specific and/or may not have been included in the initial implementation of a directory. For example, a dynamic control may be created after the directory has been implemented. In such cases, a directory processor configured to access the directory may not be capable of processing the control. In some embodiments, an existing control may be modified or replaced with a new control definition. The existing control generally includes non-native, or dynamic, controls. However, in some cases, the existing control may include a native control. Further, in some cases, the existing control may be removed, or deregistered. Alternatively, in some cases, the existing control may be replaced with a null control, or a control that is configured to cause no action to be performed thereby virtually removing the control.

Example of a Directory Service Environment

FIG. 1 illustrates an example of a directory service environment 100 in accordance with some embodiments of the present disclosure. The directory service environment 100 can include a directory service system 104. The directory service system 104 may be implemented using any type of computing system. For example, the directory service system 104 may be implemented using a server, a plurality of networked servers, or a client computing system configured with software to act as a server. Further, the directory service system 104 may include one or more database systems or repositories.

Moreover, the directory service system 104 may be configured to provide a directory service including, but not limited to, a distributed directory service. Generally, the directory service may provide access to a set of records. These records may be organized in a specific structure, such as a hierarchical structure. Some non-limiting examples of directory services can include an electronic mail directory (e.g., a corporate email directory), a telephone directory (e.g., an electronic corporate address book), and a customer directory, such as may be used by a Customer Relationship Management (CRM) system.

Further, the records may be stored in a directory 114. This directory 114 can include a database, repository, physical storage media, or other storage system configured to store the records. Although depicted as part of the directory service system 104, in some implementations, the directory 114 may be implemented as a separate system or on a separate storage device.

The directory service system 104 may be configured to use a number of different protocols for accessing and maintaining the directory service over a network 140. For example, the directory service system 104 may be configured to use the Directory Access Protocol (DAP), the LDAP application protocol, or any other type of X.500 based protocol for enabling the clients 102 to access a directory 114 over the network 140. Further, in some cases, the directory service system 104 may be configured to use a non-X.500 based protocol.

As illustrated in FIG. 1, the directory service system 104 may include a number of additional systems, some of which facilitate accessing the directory 114. For instance, the directory processor 106, which may be implemented in software or as a combination of software and hardware, can include any system for processing an operation or directory operation (e.g., the directory operation 130) associated with the directory 114. Directory operations can include any type of command related to interacting with the directory 114. These directory operations may include, for example, commands for modifying the directory 114 (e.g., add, delete, or modify an entry in the directory 114), commands for accessing the directory 114 (e.g., search for an entry or compare attributes of an entry in the directory 114), and commands relating to communicating with the directory 114 (e.g., a Bind command for specifying an LDAP protocol version), to name a few. In some implementations, the directory operation 130 may be an LDAP operation.

Further, the directory processor 106 may also process a control (e.g., the control 132), which may be included with the directory operation 130. The control can include information relating to how the operation should be processed and can be used to extend the operation. For example, a sort control may be provided with a search operation to cause the results of the search operation to be sorted based on an attribute identified in the control. In some embodiments, the control 132 may be an LDAP control.

In some implementations, an operation can include multiple controls. Further, although much of the description herein focuses on controls provided by the clients 102 to the directory service system 104 (e.g., LDAP request controls) as part of the directory operation 130, in some cases it is also possible for controls to be included by the directory service system 104 for provisioning to a client 102 as part of a response to an operation (e.g., LDAP response controls). For example, in response to an initial operation by a user, the directory service system 104 may cause a control to be sent back to the client 102 associated with the user indicating that the user's password must be changed before any operations can be completed.

A control can include a number of elements that identify the control and specify the control's operation. For example, as illustrated in FIG. 1 with respect to the control 132, a control can include an identifier, data associated with the control, and a critical tag. The identifier can include any type of identifier for identifying the control including, for example, an Object Identifier (OID). Based on this identifier, the extension runtime module 110 can determine if the control is a registered control stored in, or whose identifier is stored in, the registered controls repository 112. The registered controls can generally include non-native controls that the directory service system 104 or the directory processor 106 were not preconfigured to perform when initially developed or manufactured. Thus, in some cases, the registered controls can be after-market controls. Similarly, the directory processor 106 can determine if the control is a native control stored in, or whose identifier is stored in, the native server controls repository 108.

The data can include any type of data that may be used to specify how to process the control 132 and/or the operation 130 that includes the control 132. The critical tag can specify whether the control 132 is critical or not. In some embodiments, a critical control is a control that must be processed by the system (e.g., directory processor 106) receiving the control. If the system is unable to process the control, the operation that includes the control is rejected. If the control is not critical, or is noncritical, the system can continue to process the operation that includes the control regardless of whether the system is able to identify or process the control included with the operation.

A client 102 may provide the directory operation 130, with or without the control 132, to the directory service system 104. The dashed line leading from the directory operation 130 illustrates that the directory operation 130 is provided over a communication channel established between the client 102 and the network 140. However, communication of the directory operation 130 is not limited as such. The directory operation 130 may be provided via any type of wired or wireless network (e.g., the network 140) using any type of communication protocol. Further, in some cases, the directory operation 130 may be communicated via a direct communication connection between the client 102 and the directory service system 104.

In certain embodiments, the directory processor 106 includes a native server controls repository 108. The native server controls repository 108 may include any system that can store a list, or other data structure, that identifies controls supported by the directory processor 106. These supported controls, or native controls, may include controls that the directory processor 106 was designed to support by the developer or manufacturer of the directory processor 106. Further, the native controls may be controls that are part of a directory access protocol, such as an LDAP protocol. The system for storing the identity of the supported controls can be hardware based (e.g., a storage device), software based (e.g., a database), or a combination of the two.

The directory processor 106 may further include an extension runtime module 110. The extension runtime module 110 can generally include any module that is configured to identify controls that have been registered with the extension runtime module 110. The identity of these registered controls may be stored in the registered controls repository 112. The extension runtime module 110 may be injected into the directory processor 106 using any process for injecting a software module into an existing software system. For example, the extension runtime module 110 may be injected into the directory processor 106 using Detours from Microsoft®.

In some embodiments, the directory processor 106 may include a set of tools to enable a user or application to inject the extension runtime module 110 into the directory processor 106. Alternatively, the directory processor 106 may include a set of tools to enable an extension runtime module 110 to interact or communicate with the directory processor 106 without being injected into the directory processor 106. The set of tools may be made available as part of an Application Programming Interface (API), library, or other system for enabling an application to interact with a directory processor 106. Further, in some cases, the tools may be part of an exposed interface that enable a user to interact with a directory processor 106, such as a Command Line Interface (CLI) or Graphical User Interface (GUI). In some embodiments, the API, or other set of tools, may be included instead of or in addition to the extension runtime module 110.

In some embodiments, the control registration system 118 may inject the extension runtime module 110 into the directory processor 106. Further, the control registration system 118 may be configured to provide a control or the identity of a control to be registered with the extension runtime module 110 to the extension runtime module 110. These controls, or their identities, may then be stored in the registered controls repository 112. The control registration system 118 may include a server controls repository 120 that can store copies of the controls or control templates to be injected into the directory processor 106, or the identities of the controls to be identified to the extension runtime module 110. Further, in some cases, the server controls repository 120 may include the identities of the native controls that are stored in the native server controls repository 108.

In some implementations, the control registration system 118 may be configured to determine whether a control to be registered with the extension runtime module 110 has been previously registered, or shares an identifier with a control that has been previously registered. If so, the control registration system 118 can reject or prevent the control from being registered or reregistered. Alternatively, the control registration system 118 may enable the previously registered control to be overwritten.

In certain embodiments, the extension runtime module 110 can provide one or more of an operation and a control to the directory application 116 associated with a control identified by the extension runtime module 110. Generally, the registered controls, or the controls identified in the registered controls repository 112, differ from the controls identified in the native server controls repository 108. However, in some embodiments, there may exist some overlap between the controls identified in the registered controls repository 112 and the native server controls repository 108. For example, a user (e.g., an administrator) who desires to alter the functionality of a native control may create a new control with the same identifier as a native control. The user can then cause the control registration system 118 to register this new control with the registered controls repository 112 of the extension runtime module 110.

The directory service system 104 may include any number of directory applications 116. These directory applications 116 can include any type of application that is designed to access the directory 114. Further, the directory applications 116 can include any application designed to perform or execute one or more of the controls registered with the extension runtime module 110. Thus, in some cases, the directory applications 116 can be configured to process controls generated by the directory application 116, or a user (e.g., an administrator), that are registered with the directory processor 106.

For example, a directory application 116 may be configured to process an approval control that analyzes approval information (e.g., user identification, user authentication information, user permissions, etc.) to determine whether an operation should be performed by the directory processor 106. The directory application 116 can then allow or prevent execution of the operation based on the analysis of the approval information.

As a second example, a directory application 116 may be configured to process a critical object control that determines whether a directory operation that is requesting modification of an object or entry in the directory 114 specified as critical includes a security token. The directory application 116 can then allow or prevent execution of the operation based on whether the security token is present.

In a third example, a directory application 116 may be configured to perform application-specific auditing based on a user-defined control that is dynamically injected into the directory processor 106. Advantageously, in certain embodiments, by enabling a user to define a control, the user can create application-specific audit procedures that may differ or extend audit-control procedures that may, or may not, exist as part of the directory access protocol used by the directory processor 106.

The network 140 can include any type of wired or wireless network. For example, the network 140 can include a LAN, WAN, a cellular network, the Internet, and combinations of the same, to name a few.

The clients 102 can include any type of computing device that can interact with the directory service system 104 by, for example, providing a directory operation 130 to the directory service system 104. For example, the clients 102 can include a laptop, desktop, tablet, mobile communications device (e.g., a smartphone), or the like. The clients 102 may communicate directly with the directory service system 104 or via the network 140.

Example of a Control Registration Process

Figure 2:
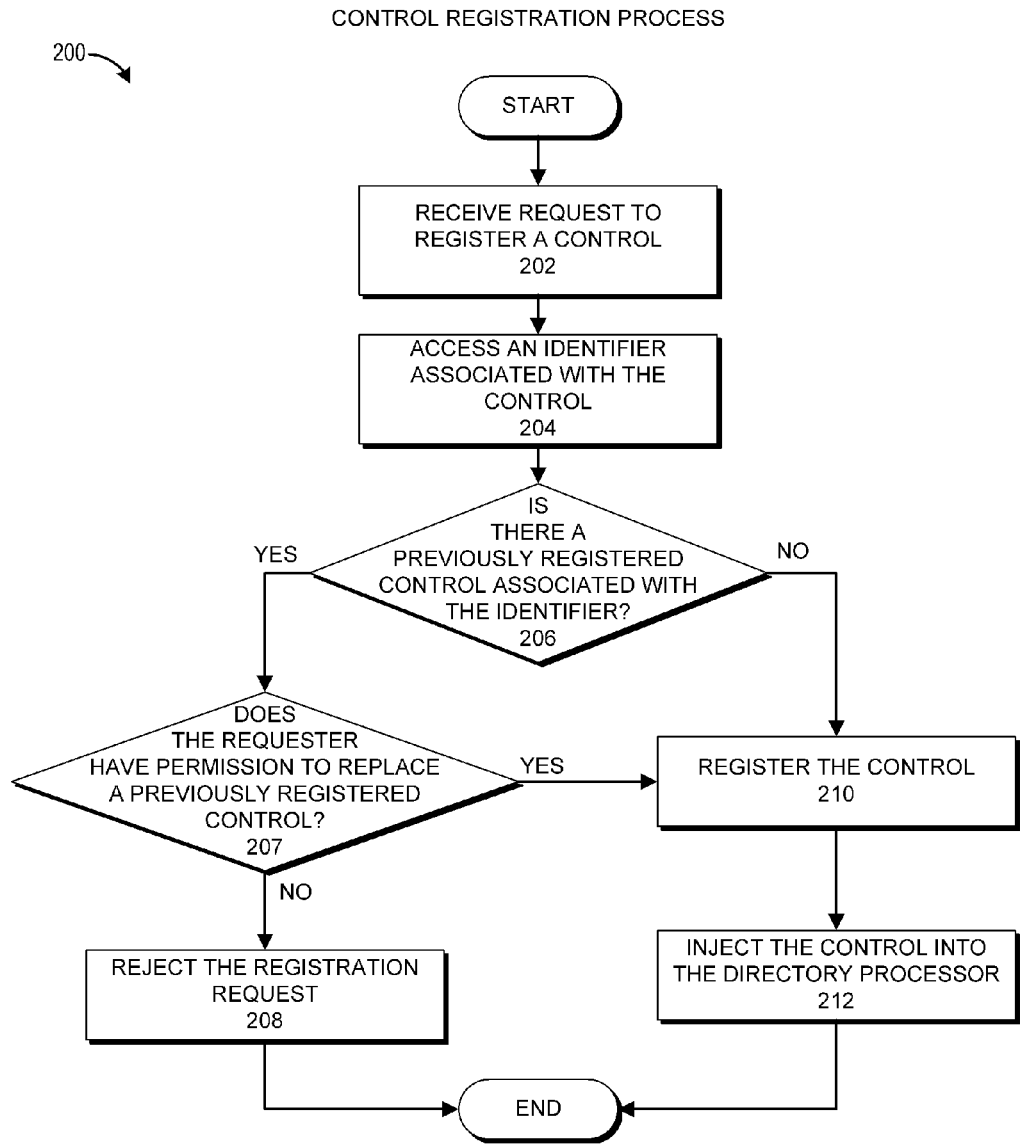
FIG. 2 presents a flowchart for an example of a control registration process in accordance with some embodiments of the present disclosure.

FIG. 2 presents a flowchart for an example of a control registration process 200 in accordance with some embodiments of the present disclosure. The process 200 can be implemented by any system that can register a control with a directory processor 106. For example, the process 200, in whole or in part, can be implemented by the control registration system 118 or a directory application 116, which may or may not include a control registration system 118. Although any number of systems can implement the process 200, in whole or in part, to simplify discussion, the process 200 will be described as being generally implemented by the control registration system 118.

The process 200 begins at block 202 where, for example, the control registration system 118 receives a request to register a control. Generally, this control can include any type of control that is not native to or defined by a directory access protocol (e.g., LDAP) that is implemented by the directory service system 104, the directory processor 106, and/or the directory 114. The request to register the control may be received from a client 102, a directory application 116, a user interacting with the control registration system 118, or any other system or application that can generate a control registration request.

At block 204, the control registration system 118 can access an identifier associated with the control. This identifier may include an OID or any other type of identifier that may be used to uniquely identify a control. At decision block 206, the control registration system 118 determines if a previously registered control associated with the identifier exists. The control registration system 118 may make this determination by accessing the server controls repository 120, which may include the identity of the previously registered controls. In some cases, the server controls repository 120 may also include the identity of native controls that the directory service system 104, the directory processor 106, and/or the directory 114 is configured to support.

If the control registration system 118 determines at the decision block 206 that the control, or another control with the same identifier, has been previously registered, or, in some cases, exists as a native control, the control registration system 118 determines whether the requester (e.g., the user or application that provided the request at block 202) has permission to replace a previously registered control at decision block 207. In some cases, the decision block 207 includes determining whether the requester has permission to replace a native control. If the requester does not have permission to replace a control, the control registration system 118 rejects the registration request at the block 208. Rejecting the registration request can include providing a message, warning, or other response to the user or system that initiated the registration request or provided the registration request to the control registration system 118 at the block 202. In some embodiments, the block 207 is optional. Thus, in some embodiments, if a previously registered control associated with the identifier exists, the control registration system 118 rejects the registration request at the block 208 regardless of the permissions of the requester.

If the control registration system 118 determines at the decision block 206 that a previously registered control with the same identifier does not exist, or has not been registered, the control registration system 118 registers the control at the block 210. Similarly, if the control registration system 118 determines at the decision block 207 that the requester has permission to replace a previously registered control, or a native control, the control registration system 118 registers the control at the block 210. Registering the control can include storing the control, a template associated with the control, and/or the identity of the control at the server controls repository 120. Further, registering the control can include identifying one or more directory applications 116 that are capable of processing the control and storing the identity of the one or more applications 116 at the server controls repository 120.

At block 212, the control registration system 118 injects the control into the directory processor 106. Injecting the control can include injecting a copy of the control, a template associated with the control, and/or the identifier (e.g., OID) for the control into the directory processor 106 and/or the extension runtime module 110. Further, injecting the control can include storing one or more of the copy of the control, the template associated with the control, and the identifier for the control at the registered controls repository 112. In addition, injecting the control can include injecting the identity of one or more applications 116 that are capable of processing the control. The identity of the one or more applications 116 can be stored at the registered controls repository 112. In certain cases, the extension runtime module 110 may determine which of the applications 116 to use to process the injected control. In some cases, the control may specify which of the applications 116 to use to processing the injected control.

In some embodiments, the process 200 may be modified to enable a control to be deregistered. For example, the block 202 may include receiving a request to deregister the control. Then the identifier for the control may be identified at the block 204. At decision block 206, the control registration system 118 can determine whether the control was previously registered or if the control is unregistered. If the control was unregistered, or not previously registered, the request to deregister the control is rejected. Alternatively, in some cases, the request may be identified as completed or unnecessary due to lack of a control to deregister. If the control was previously registered, the control registration system 118 can deregister, or remove the identity of the control, the control, and/or the control template from the server controls repository 120. Further, the control registration system 118 can cause the extension runtime module 110 to remove the identity of the control, the control, and/or the control template from the registered controls repository 112.

In some embodiments, deregistering the control includes determining whether the control is a native control or a control registered by a user or application. If the control is a native control, the request to deregister the control is rejected. If the control is not a native control, the control registration system 118 can proceed with the process to deregister the control.

The process 200, in some cases, may be used to replace or update a previously registered control with a new control. In such embodiments, the blocks 206, 207, and 208 may be optional. In some embodiments, if the control registration system 118 determines that a previously registered control associated with the identifier exists at the decision block 206, the control registration system 118, instead of rejecting the registration request, replaces information associated with the previously registered control with information associated with the new or updated control. For example, the control registration system 118 may replace a control template associated with the previously registered control with a control template associated with the new or updated control.

In some embodiments, the process 200 may be used to update or replace native controls in addition to dynamic or registered controls. In some such embodiments, the process 200 may include informing a user that the registered control shares an identifier with a native control. The user can then confirm whether to replace the native control. In certain embodiments, replacing a native control may include authenticating a user, confirming the user's access permissions, and/or confirming an application's access permissions for the user and/or application attempting to modify or replace the native control. For example, in some cases, replacing native controls may be limited to administrators or other authorized personnel.

In some embodiments, the process 200 can be used to remove or disable native controls. In some cases, the native controls may be disabled or removed for security, such as to limit the controls that may be used. In some embodiments, directory operations that include native controls that have been removed or disabled may be modified to remove the native control from the directory operation. Alternatively, the directory operation that includes a disabled native control may be rejected.

Example of a Process for Performing a Directory Operation

Figure 3:
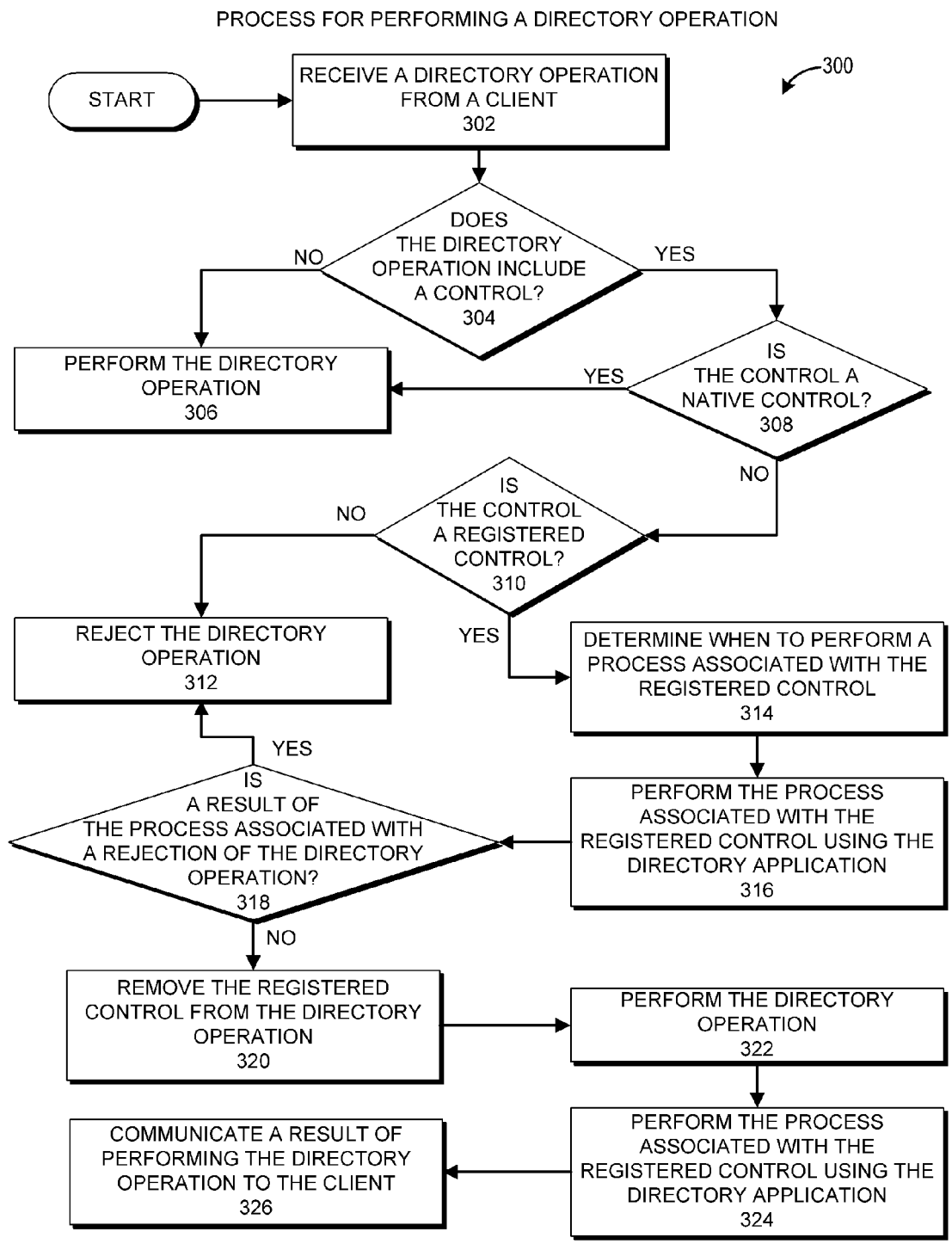
FIG. 3 presents a flowchart for an example of a process for performing a directory operation in accordance with some embodiments of the present disclosure.

FIG. 3 presents a flowchart for an example of a process 300 for performing a directory operation in accordance with some embodiments of the present disclosure. The process 300 can be implemented by any system that can perform or execute a control associated with a directory. For example, the process 300, in whole or in part, can be implemented by one or more of the directory service system 104, the directory processor 106, the extension runtime module 110, the directory 114, and the directory applications 116. Although any number of systems can implement the process 300, in whole or in part, to simplify discussion, the process 300 will be described as being generally implemented by the directory service system 104.

The process 300 begins at block 302 where, for example, the directory service system 104 receives a directory operation 130 from a client 102. In some embodiments, the block 302 may include providing the directory operation 130 to one or more of the directory processor 106 and the extension runtime module 110.

At decision block 304, the directory service system 104 using, for example, the extension runtime module 110 determines whether the directory operation (e.g., directory operation 130) includes a control (e.g., control 132). If the extension runtime module 106 determines that the directory operation does not include a control, the directory service system 104 using, for example, the directory processor 106 performs or executes the directory operation at the block 306.

If the extension runtime module 106 determines that the directory operation includes a control, the extension runtime module determines whether the control is a native control at decision block 308. Determining whether the control is a native control can include accessing the native server controls repository 108 to determine whether an identifier (e.g., an OID) associated with the control is included in the native server controls repository 106. Alternatively, or in addition, determining whether the control is a native control can include accessing the registered controls repository 112 to determine whether the identifier is stored in the repository.

If the extension runtime module 106 determines that the control is a native control, the directory service system 104 using, for example, the directory processor 106 performs or executes the directory operation at the block 306. In some cases, the block 306 may include performing a process associated with the control included with the directory operation and/or modifying execution of the operation based on the control.

If the extension runtime module 110 determines that the control is not a native control, the extension runtime module 106 determines whether the control is a registered control at the decision block 310. The registered control can include any control that is not native to or inherent in the operation of a directory processor 106 that is designed based on, or to operate with, a directory access protocol (e.g., LDAP). Further, the registered control can include any control that is registered with the directory processor 106 or the directory service system 104 using the process 200. Determining whether the control is a registered control can include accessing the registered controls repository 112 to determine whether an identifier associated with the control is stored in the repository.

If the extension runtime module 110 determines that the control is not a registered control, the extension runtime module 110 causes the directory processor 106 to reject the directory operation at decision block 312. Alternatively, in some embodiments, the extension runtime module 110 may strip out or remove the control from the directory operation and then proceed to the block 306 thereby enabling the directory processor 106 to perform the directory operation without the control. Further, in some cases, the extension runtime module 110 may determine whether to cause the directory operation to be rejected or performed without the control based on whether the control is associated with a critical tag or whether a critical tag associated with the control indicates that the control is critical.

If the extension runtime module 110 determines that the control is a registered control, the extension runtime module 110 determines when to perform a process associated with the registered control at the block 314. In some embodiments, the block 314 is optional. At block 316, the directory service system 104 performs a process associated with the registered control using a directory application 116. In some cases, multiple processes associated with the registered control may be performed at the block 316. Performing the process associated with the registered control can include providing the control, the directory operation, and/or information associated with the control or directory operation to the directory application 116. Further, in some cases, performing the process associated with the registered control can include selecting a directory application from a set of directory applications 116 to perform the process based on the control included with the directory operation. As described further below, in some embodiments, the block 316 may be optional or may not be performed. Further, in some cases, the block 316 may be performed for some registered controls, but not others.

At decision block 318, the directory service system 104 using, for example, the extension runtime module 110 or the directory application 116, determines whether the result of the process associated with the registered control indicates that the directory operation is rejected or is not to be performed. If so, the directory operation is rejected at the block 312. Rejecting the operation can include causing a message associated with the outcome of the process associated with the control to be provided to a user or application that caused the directory operation to be provided to the directory service system 104. Further, rejecting the operation can include causing a message associated with the rejection of the directory operation to be provided to a user or application that caused the directory operation to be provided to the directory service system 104. In some embodiments, the decision block 318 may be optional or may not be performed. For example, if the determination at the block 314 indicates that the process associated with the control is to be performed after the directory operation is executed or performed, the decision block 318 may not be performed.

If the result of the process associated with the registered control is not associated with rejecting the directory operation, the extension runtime module 110 strips out or removes the control from the directory operation at the block 320. In some embodiments, the block 320 may be optional. For example, if the control is a native control, or if the directory processor 106 is capable of processing or ignoring a registered control, the control may not be removed from the directory operation at the block 320. At block 322, the directory service system 104 using, for example, the directory processor 106 performs or executes the directory operation at the block 322 using an instance of the directory operation with the control removed. In some embodiments, the block 322 is performed with the directory operation that includes the control. In such embodiments, the directory processor 106 may ignore the control as an unrecognized control. In some embodiments, the process of performing the directory operation may depend on the result of the process performed at the block 316. For instance, if the directory operation is an add new entry operation, the result of the process performed at the block 316 may determine the location within the directory 114 where the new entry is added, the security permissions required to remove or modify the entry after its added, or both.

At block 324, the directory service system 104 performs a process associated with the registered control using a directory application 116. In some embodiments, some or all of the embodiments described above with respect to the block 316 may apply to the block 324. Further, as with the block 316, in some embodiments, the block 324 may be optional or may not be performed. In some cases, the block 324 may be performed for some registered controls, but not others.

In some cases, the process associated with the registered control may be performed in part at the block 316 and in part at the block 324. For example, the process may be initiated at the block 316 and completed at the block 324. With some controls, whether the block 324 is performed may depend on the outcome of the block 322. For example, the process associated with the block 324 may include a commit process that confirms or commits the process performed at the block 316 based on the outcome of the directory operation performed at the block 322. Similarly, the process associated with the block 324 may include a rolling back or undo process based on the outcome of the directory operation performed at the block 322.

In some cases, the process associated with the registered control may be performed at either the block 316 or the block 324 based on the determination at the block 314. Thus, in some instances, one of the blocks 316 and 324 may be optional. For example, if the extension runtime module 110 determines at the block 314 that the process associated with the control is to be performed after the directory operation, the process 300 may proceed to block 320 after completing the process associated with the block 314. Further, in some instances, one or more of the blocks 316 and 324 may be performed in parallel with the block 322. In embodiments where the block 314 is optional or is not performed, the directory service system 104 may be configured to perform one of the block 316 or the block 324 by default. In some embodiments, the block 322 may be optional. In other embodiments, the block 322 may be performed after a set of controls are performed or in response to a control including a commit command. Advantageously, in certain embodiments, a number of controls can be performed and/or a number of directory operations may be queued before the directory operations are executed as part of a batch process. In some cases, performing directory operations as a batch can improve the performance of the directory processor 106 by, for example, limiting the number of accesses to the directory repository 114.

At the block 326, the directory service system 104 communicates a result of performing the directory operation to the client 102. In some cases, the block 326 may include communicating a result of performing a process associated with the control. Further, in some embodiments, the block 326 may be optional.

FIG. 3 illustrates one example sequence for performing the process 300. However, the process 300 is not limited to the sequence illustrated in the figure and described above. For example, in some cases, the decision block 310 can be performed in parallel with or prior to the decision block 308. Advantageously, in some embodiments, by performing the decision block 310 prior to the decision block 308, the process 300 can be used with controls that have been implemented to override or redefine a native control by using the same control identifier as the native control.

In some embodiments, the process 300 does not depend on whether the control is a native control or a registered control. In such embodiments, the decision block 308 and the decision block 310 may be combined into a single decision block that determines whether the control, registered or native, is associated with an identifier that is recognized by the extension runtime module 110 (e.g., an identifier stored in the registered controls repository 112 or the native server controls repository 108). If the control is not recognized by the extension runtime module 110, the process 300 may proceed to block 312 and reject the associated directory operation. Alternatively, the extension runtime module 110 may strip out the control and proceed to block 306 where the directory operation is performed.

Example Operation of a Directory Service Environment

Figure 4:
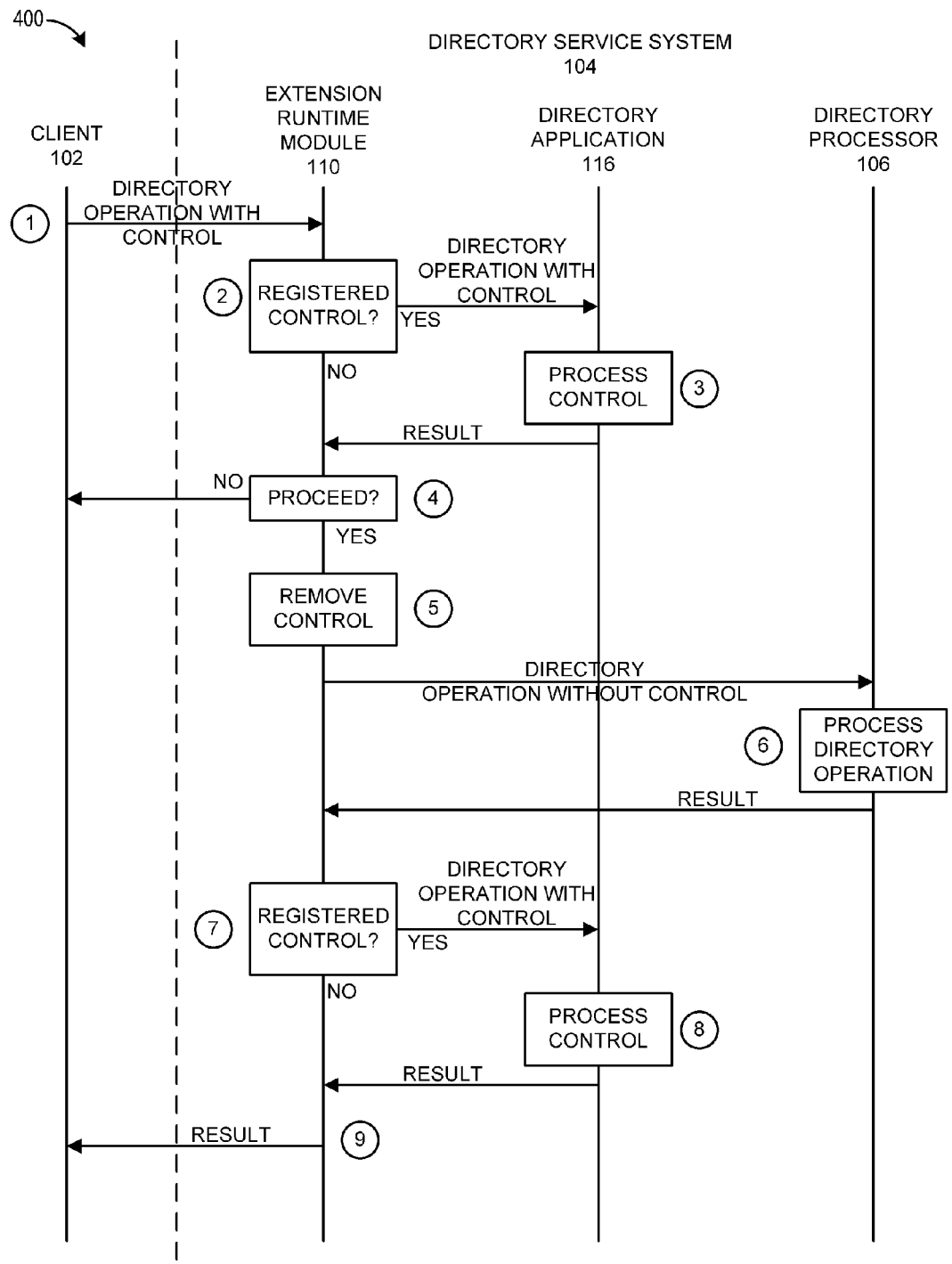
FIG. 4 illustrates an example flow for the operation of a directory service environment during execution of a process for performing a directory operation in accordance with some embodiments of the present disclosure.

FIG. 4 illustrates an example flow 400 for the operation of a directory service environment 100 during execution of a process 300 for performing a directory operation in accordance with some embodiments of the present disclosure. In the example flow 400 illustrated in FIG. 4, a directory operation with a control is communicated by a client 102 to a directory service system 104 that includes the extension runtime module 110, the directory application 116 and the directory processor 106. In this example flow 400, the control included with the directory operation is a nonnative control. Those skilled in the art will recognize that the example flow 400 may be modified to process native controls. The example flow 400 is described below with respect to "events" associated with the circled numbers illustrated in FIG. 4. These events are used to facilitate explanation of the example flow 400 and are not intended to limit the example flow 400. For example, in some cases, the events may be separated into a greater number of discrete processes, combined into a fewer number of discrete processes, or performed in parallel.

The example flow 400 begins at event 1 with the client 102 providing the directory operation with the control to the directory service system 104 where it is received by the extension runtime module 110. In certain embodiments, the client 102 may not be aware of the extension runtime module 110. Thus, in some cases, the extension runtime module 110 may intercept the directory operation with the control as it is received by the directory service system 104 regardless of whether the client 102 directed the directory operation to the extension runtime module 110.

During event 2, the extension runtime module 110 determines whether the control is a registered control. If so, the extension runtime module 110 provides the directory operation with the control to the directory application 116. The directory application 116 then processes the control at event 3. A result of processing the control may then be provided to the extension runtime module 110. This result can include an indication of whether the processing of the control succeeded or failed. In addition, or alternatively, the result may indicate whether to proceed with processing the directory operation. In some embodiments, the directory application 116 may modify the directory operation and/or control parameters at event 3. The modified directory operation may then be performed during event 6, which is discussed below. Further, the modified control may be processed during event 8, which is discussed further below. In some cases, modifying the directory operation and/or control may include replacing the directory operation and/or control with a new directory operation and/or control. The modified directory operation and/or control may then be provided as part of the result to the extension runtime module 110.

As previously described above with respect to FIG. 3, in some cases, the control may be processed after the directory operation. In such cases, the event 3 may not occur. Further, in some cases, the control may be processed in part at event 3 and in part at a later point in the example flow 400 (e.g., the event 8).

During the event 4, the extension runtime module 110 determines whether to proceed with processing the directory operation and/or the control. This determination may be based on the result received from the directory application 116 at event 3 or based on whether the control was determined to be a registered control at event 2. If the extension runtime module 110 determines not to proceed with processing the directory operation, the extension runtime module 110 may cause the directory service system 104 to report the success or failure of processing the directory operation and/or the control at event 4. This reporting may include a message indicating the reason for the success or failure of processing the directory operation and/or control. If the extension runtime module 110 determines that processing of the directory operation is to continue, the extension runtime module 110 removes the control from the directory operation at event 5. In cases where the control is a native control, the extension runtime module 110 may or may not remove the control from the directory operation.

The extension runtime module 110 provides the directory operation without the control to the directory processor 106, which processes the directory operation at event 6. The directory processor 106 may then provide a result of processing the directory operation to the extension runtime module 110. This result may include an indication that the directory operation was or was not successfully completed or performed. Further, the result may include any data that is associated with the directory operation. For example, if the directory operation is a search operation, the result may include the data identified by performing the search operation. In some cases, the extension runtime module 110 may not remove the control (e.g., when the control is a native control). In such cases, the extension runtime module 110 may provide the directory operation with the control to the directory processor 106.

Similar to event 2, at event 7 the extension runtime module 110 determines whether the control is a registered control. If so, the extension runtime module 110 provides the directory operation with the control to the directory application 116. In some embodiments, the extension runtime module 110 may also provide the result of processing the directory operation received after event 6 to the directory application 116 with the directory operation. The directory application 116 then processes the control at event 8. In some cases, processing the control may be based on the result of processing the directory operation received from the extension runtime module 110. A result of processing the control may then be provided to the extension runtime module 110. This result can include an indication of whether the processing of the control succeeded or failed.

As previously described above with respect to FIG. 3, in some cases, the control may be processed before the directory operation. In such cases, the event 8 may not occur. Further, in some cases, the control may be processed in part at event 8 and in part at an earlier point in the example flow 400 (e.g., the event 3).

In some embodiments, the extension runtime module 110 determines when the control is to be performed. In such embodiments, the extension runtime module 110 will determine at event 2 and at event 7 whether a directory operation with a registered control should be provided to the directory application 116. Alternatively, in some embodiments, the directory application 116 determines when the control is to be performed. In such embodiments, the extension runtime module 110 may provide the directory operation with the registered control to the directory application 116 at event 2. The directory application 116 can then determine whether to process the control at event 3, event 8, or partially at event 3 and partially at event 8. Further, the extension runtime module 110 may provide the directory operation with the registered control to the directory application 116, an indication that the directory operation has been processed, and/or a result of the directory operation at event 7.

At event 9, the extension runtime module 110 can provide a result of performing the directory operation. Providing the result may or may not also include providing a result of performing the control.

In some cases, the extension runtime module 110 may determine whether to perform event 7 based on the result provided by the directory processor 106 after processing the directory operation at event 6. For example, if the result indicates that the directory operation was not processed successfully, the extension runtime module 110 may report to the client 102 that the directory operation failed and cease any further processing of the directory operation and/or control included with the directory operation. In some cases, the control may be processed if the result of processing the directory operation indicates that the processing was unsuccessful. For example, if the control relates to auditing or logging, the control may be performed regardless of whether the directory operation is executed successfully or, in some cases, the control may be performed only when the directory operation fails to execute or to be performed successfully.

Terminology

A number of computing systems have been described throughout this disclosure. The descriptions of these systems are not intended to limit the teachings or applicability of this disclosure. Further, the processing of the various components of the illustrated systems can be distributed across multiple machines, networks, and other computing resources. For example, the directory processor 106 and the control registration system 118 can each be implemented as separate computing systems, or alternatively, as one server or computing system. In addition, two or more components of a system can be combined into fewer components. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 3, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for performing a directory operation by a computing system comprising one or more processors, the method comprising:
 receiving at a directory processor a directory operation comprising a control;
 wherein the control comprises information relating to how the directory operation should be processed on a directory service system, the information comprising at least one identifier specifying importance of the control;
 determining, utilizing the information, whether the control is a registered control; and
 in response to determining that the control is a registered control:
  identifying a directory application configured to process the control;
  providing the control to the directory application to process thereby enabling a directory operation to comprise one or more controls that the directory processor is not natively configured to execute; and
  executing the directory operation.

2. The method of claim 1, wherein, in response to determining that the control is a registered control, the method further comprises removing the control from the directory operation.

3. The method of claim 2, wherein the control is removed from the directory operation prior to executing the directory operation.

4. The method of claim 1, wherein, in response to determining that the control is a registered control, the method further comprises modifying the control of the directory operation.

5. The method of claim 1, wherein the registered control comprises a non-native control.

6. The method of claim 1, further comprising, in response to providing the control to the directory application, receiving a response from the directory application.

7. The method of claim 6, further comprising executing the directory operation based on the response.

8. The method of claim 6, wherein the response includes a modified directory operation, and wherein executing the directory operation further comprises executing the modified directory operation.

9. The method of claim 1, wherein, in response to determining that the control is a native control, the method further comprises:
 performing an operation associated with the native control; and
 executing the directory operation without removing the control from the directory operation.

10. The method of claim 9, further comprising executing the directory operation based on the control.

11. The method of claim 1, further comprising providing a result of processing the directory operation to the directory application, thereby enabling the directory application to process the control based on the result of processing the directory operation.

12. The method of claim 1, wherein, in response to determining that the control is a registered control, the method further comprises:
 performing a first process associated with the directory operation to obtain a first directory operation result;
 providing the first result to the directory application, thereby enabling the directory application to use the first result in processing the control;
 receiving a control result from the directory application; and
 performing a second process associated with the directory operation based on the control result to obtain a second directory operation result.

13. Non-transitory physical computer storage comprising computer-executable instructions that direct a computing system to perform a method for performing a directory operation, the method comprising:
 receiving at a directory processor a directory operation comprising a control;
 wherein the control comprises information relating to how the directory operation should be processed on a directory service system, the information comprising at least one identifier specifying importance of the control;
 determining, utilizing the information, whether the control is a registered control; and
 in response to determining that the control is a registered control:
  identifying a directory application configured to process the control;
  providing the control to the directory application to process; and
  executing the directory operation.

14. The non-transitory physical computer storage of claim 13, wherein, in response to determining that the control is a registered control, the method further comprises removing the control from the directory operation prior to executing the directory operation.

15. The non-transitory physical computer storage of claim 13, wherein, in response to providing the control to the directory application, the method further comprises receiving a response from the directory application.

16. The non-transitory physical computer storage of claim 15, wherein the method further comprises executing the directory operation based on the response.

17. The non-transitory physical computer storage of claim 15, wherein the response includes a modified directory operation and wherein executing the directory operation further comprises executing the modified directory operation.

18. The non-transitory physical computer storage of claim 13, wherein, in response to determining that the control is a native control, the method further comprises:
 performing an operation associated with the native control; and
 executing the directory operation without removing the control from the directory operation.

19. The non-transitory physical computer storage of claim 18, wherein the method further comprises executing the directory operation based on the control.

20. The non-transitory physical computer storage of claim 13, wherein the method further comprises providing a result of processing the directory operation to the directory application, thereby enabling the directory application to process the control based on the result of processing the directory operation.

21. The non-transitory physical computer storage of claim 13, wherein, in response to determining that the control is a registered control, the method further comprises:
 performing a first process associated with the directory operation to obtain a first directory operation result;

providing the first result to the directory application, thereby enabling the directory application to use the first result in processing the control;

receiving a control result from the directory application; and performing a second process associated with the directory operation based on the control result to obtain a second directory operation result.

22. A system for performing a directory operation, the system comprising:

a directory processor comprising computer hardware, the directory processor configured to receive a directory operation comprising a control, and to execute the directory operation; and wherein the control comprises information relating to how the directory operation should be processed on a directory service system, the information comprising at least one identifier specifying importance of the control;

an extension runtime module configured to determine, utilizing the information, whether the control is a registered control, and, in response to determining that the control is a registered control, the extension runtime module is further configured to:

identify a directory application configured to process the control; and provide the control to the directory application to process.

23. The system of claim 22, wherein the directory processor comprises the extension runtime module.

24. The system of claim 22, wherein the extension runtime module is further configured to remove the control from the directory operation.

25. The system of claim 22, wherein the directory processor is further configured to execute the directory operation based on a response to the directory application receiving the control.

26. The system of claim 22, wherein the control comprises a native control and wherein the directory processor is further configured to:

perform an operation associated with the native control; and execute the directory operation with the native control.

* * * * *